(12) United States Patent
Wang et al.

(10) Patent No.: US 11,271,647 B2
(45) Date of Patent: Mar. 8, 2022

(54) FREE-SPACE OPTICAL SIGNAL ALIGNMENT AND TRANSMISSION DEVICE, SYSTEM AND METHOD

(71) Applicant: HANGZHOU MO-LINK TECHNOLOGY CO. LTD, Hangzhou (CN)

(72) Inventors: Hao Wang, Hangzhou (CN); Dong Wang, Hangzhou (CN)

(73) Assignee: HANGZHOU MO-LINK TECHNOLOGY CO. LTD, Hangzhou (CN)

( * ) Notice: Subject to any disclaimer, the term of this patent is extended or adjusted under 35 U.S.C. 154(b) by 79 days.

(21) Appl. No.: 16/722,976

(22) Filed: Dec. 20, 2019

(65) Prior Publication Data

US 2020/0204254 A1    Jun. 25, 2020

(30) Foreign Application Priority Data

Dec. 25, 2018  (CN) .......................... 201811593431.8

(51) Int. Cl.
*H04B 10/112*        (2013.01)
*G02B 6/32*           (2006.01)
(Continued)

(52) U.S. Cl.
CPC .............. *H04B 10/112* (2013.01); *G02B 6/32* (2013.01); *G02B 6/4204* (2013.01); *H04B 10/503* (2013.01); *H04B 10/69* (2013.01)

(58) Field of Classification Search
CPC   H04B 10/503; H04B 10/112; H04B 10/1141; H04B 10/671; H04B 10/69;
(Continued)

(56) References Cited

U.S. PATENT DOCUMENTS 5,621,829 A *  4/1997  Ford ...................... G02B 6/359
                                                    385/115
7,146,105 B1 * 12/2006  Tzeng ................ H04B 10/1127
                                                    398/128
(Continued)

OTHER PUBLICATIONS

Zhang et al; Fiber based free space optical coherent receiver with vibration compensation mechanism, Jul. 2013, optical society of America; pp. 1-8. (Year: 2013).*

*Primary Examiner* — Amritbir K Sandhu
(74) *Attorney, Agent, or Firm* — Li & Cai Intellectual Property (USA) Office

(57) ABSTRACT

Provided is a free-space optical signal alignment and transmission device, system, and method. The alignment and transmission device includes an optical engine and a collimating lens module which are connected. The optical engine converts an electrical signal into an optical signal and includes a base board, and a laser driver chip, a laser, a lens array module, a photodiode, and an electrical signal amplifier chip that are provided on the base board; the collimating lens module collimates and sends the optical signal transmitted from the optical engine to free space for transmission, and further shapes and sends the optical signal received from the free space to the optical engine. The laser is connected to the laser driver chip and the lens array module. One end of the photodiode is connected to the lens array module, and the other end thereof is connected to the electrical signal amplifier chip.

10 Claims, 4 Drawing Sheets

(51) Int. Cl.
*G02B 6/42* (2006.01)
*H04B 10/50* (2013.01)
*H04B 10/69* (2013.01)

(58) Field of Classification Search
CPC ........ H04B 10/11; G02B 6/32; G02B 6/4204; G02B 27/1006; G02B 27/30; H04Q 11/0005; H04Q 2011/0015
USPC .................................................. 398/115–118
See application file for complete search history.

(56) References Cited

U.S. PATENT DOCUMENTS

| | | | | |
|---|---|---|---|---|
| 8,748,797 B1* | 6/2014 | Decker | ............ | H03F 3/08 250/214 R |
| 10,735,333 B2* | 8/2020 | Kachrani | ............ | H04Q 11/0005 |
| 2002/0057873 A1* | 5/2002 | Wu | ............ | G02B 6/262 385/33 |
| 2003/0053745 A1* | 3/2003 | Chen | ............ | G02B 6/3524 385/20 |
| 2004/0202415 A1* | 10/2004 | Ohmuro | ............ | H04B 10/1125 385/24 |
| 2005/0100339 A1* | 5/2005 | Tegge | ............ | H04B 10/118 398/125 |
| 2010/0226655 A1* | 9/2010 | Kim | ............ | G02B 27/145 398/139 |
| 2011/0044696 A1* | 2/2011 | Lim | ............ | G02B 6/4246 398/139 |
| 2011/0268453 A1* | 11/2011 | Fest | ............ | G01S 7/499 398/129 |
| 2011/0274429 A1* | 11/2011 | Caplan | ............ | H04B 10/677 398/65 |
| 2014/0241731 A1* | 8/2014 | Peach | ............ | H04B 10/11 398/128 |
| 2015/0110491 A1* | 4/2015 | Gayrard | ............ | H04L 1/0065 398/79 |
| 2015/0125157 A1* | 5/2015 | Chao | ............ | H04B 10/118 398/122 |
| 2015/0215041 A1* | 7/2015 | Pechner | ............ | H03M 13/3769 398/130 |
| 2016/0274305 A1* | 9/2016 | Ye | ............ | G02B 6/2746 |
| 2016/0329961 A1* | 11/2016 | Li | ............ | H04B 10/1125 |
| 2018/0306985 A1* | 10/2018 | Son | ............ | G02B 6/423 |
| 2020/0204254 A1* | 6/2020 | Wang | ............ | H04B 10/69 |
| 2020/0213007 A1* | 7/2020 | Wang | ............ | H04B 10/1143 |
| 2020/0333441 A1* | 10/2020 | Diaz | ............ | G01S 7/4815 |

\* cited by examiner

FREE-SPACE OPTICAL SIGNAL ALIGNMENT AND TRANSMISSION DEVICE, SYSTEM AND METHOD

FIELD OF THE DISCLOSURE

The present disclosure relates to the field of information transmission technologies, and more particularly to a free-space optical signal alignment and transmission device, system and method.

BACKGROUND OF THE DISCLOSURE

As the transmission capacity increasingly grows in the communication field, it is difficult to meet the requirements in terms of the transmission capacity and transmission speed by means of the conventional transmission technologies. In addition, as various intelligent terminals gain increasing improvement in their computing capacity, and become increasingly thin and portable, it is inconvenient for users to use the conventional cables for signal transmission. Although radio signal transmission technology, such as WIFI and Bluetooth, can overcome such inconvenience to a certain degree, this technology has obvious limitations in high-speed signal transmission at present.

SUMMARY OF THE DISCLOSURE

To solve the problems in the prior art to at least a certain degree, the present disclosure provides a free-space optical signal alignment and transmission device, system and method.

According to a first aspect of the embodiments of the present disclosure, the present disclosure provides a free-space optical signal alignment and transmission device, which includes an optical engine and a collimating lens module that are connected, where the optical engine is configured to convert an electrical signal into an optical signal; the collimating lens module is configured to collimate the optical signal transmitted from the optical engine and then send the collimated signal to free space for transmission; the collimating lens module is further configured to shape the optical signal received from the free space and then send the shaped signal to the optical engine; and the optical engine is further configured to convert the optical signal into an electrical signal;

the optical engine comprises a base board, and a laser driver chip, a laser, a lens array module, a photodiode, and an electrical signal amplifier chip that are provided on the base board;

an electrical signal externally loaded with information is input into the laser driver chip, and the laser driver chip drives the laser to emit light; the lens array module is configured to collimate or totally reflect the optical signal, or to collimate the optical signal and make it straightly pass through; and the collimating lens module collimates the optical signal transmitted from the optical engine and then sends the collimated signal to the free space for transmission; and the collimating lens module shapes the optical signal received from the free space and then sends the shaped signal to the lens array module; the lens array module adjusts the optical signal transmitted thereto, and then sends the adjusted signal to the photodiode; the photodiode converts the optical signal into an electrical signal, and then sends the electrical signal to the electrical signal amplifier chip for amplification; and a signal output by the electrical signal amplifier chip is sent to an external circuit.

Further, the free-space optical signal alignment and transmission device further includes an optical fiber, where the optical engine is connected to the collimating lens module via the optical fiber.

Further, the lens array module is formed by one or multiple lenses.

Further, when the lens array module is formed by one lens and is used to refract a light path, the lens has a first surface, a second surface, and a third surface;

the optical signal that is sent out enters the lens through its first surface, is refracted by the second surface and transmitted out of the lens through the third surface, and then enters the collimating lens module; and the optical signal collimated by the collimating lens module enters the lens through its third surface, is refracted by the second surface and transmitted out of the lens through the first surface, and then enters the photodiode.

Further, an included angle between the second surface of the lens and an incident direction of the optical signal is 45°.

Further, when the lens array module is formed by one lens and is used to make the light path straightly pass through, the lens has a fourth surface and a fifth surface;

the optical signal that is sent out enters the lens through its fourth surface, is transmitted out of the lens through the fifth surface, and directly enters the collimating lens module; and the optical signal collimated by the collimating lens module enters the lens through its fifth surface, is transmitted out of the lens through the fourth surface, and enters the photodiode.

Further, the free-space optical signal alignment and transmission device further includes a WDM unit, configured to combine multiple paths of optical signals output by the optical engine on one path for transmission, and further configured to split the received one path of optical signal into multiple paths for transmission.

According to a second aspect of the embodiments of the present disclosure, the present disclosure further provides a free-space optical signal alignment and transmission system, which includes a driver controller and at least one information transceiver chip, where the free-space optical signal alignment and transmission device described in any one of the foregoing aspects is disposed on the information transceiver chip, and the information transceiver chip is further provided with a transceiving transfer switch;

the driver controller controls the transceiving transfer switch to perform a state switch; the laser driver chip drives the laser to convert an electrical signal into an optical signal; then the optical signal refracts or straightly passes through the lens array module, enters the collimating lens module and is collimated by it; and the collimated signal is sent to free space for transmission; and the collimating lens module collimates the optical signal, and sends the collimated signal to the lens array module; then the optical signal refracts or straightly passes through the lens array module, enters the photodiode, and is converted by the photodiode into an electrical signal; the electrical signal is sent to the electrical signal amplifier chip, and the electrical signal amplifier chip amplifies the electrical signal and outputs the amplified signal.

According to a third aspect of the embodiments of the present disclosure, the present disclosure further provides a free-space optical signal alignment and transmission method, which includes the following steps:

driving, by a driver controller by using a laser driver chip, a laser to convert an electrical signal to be transmitted into an optical signal;

the optical signal entering a lens array module, and refracting or straightly passing through the module;

the optical signal transmitted out of the lens array module converging on an optical fiber for transmission or directly entering a collimating lens module; and collimating, by the collimating lens module, one or multiple paths of optical signals into a collimated light beam, which then enters free space for transmission.

Further, the free-space optical signal alignment and transmission method also includes the following steps:

converging, by the collimating lens module, the optical signal transmitted from the free space, and then sending it to the optical fiber or directly to the lens array module;

adjusting, by the lens array module, the light beam of the one or multiple paths of optical signals from the optical fiber, totally reflecting the light beam and then sending it to a photodiode; or adjusting the light beam and then directly sending it to the photodiode; and converting, by the photodiode, the received optical signal into an electrical signal, and then sending the electrical signal to an electrical signal amplifier chip; and amplifying, by the electrical signal amplifier chip, the electrical signal and then outputting the amplified signal.

Based on the foregoing specific implementation manners of the present disclosure, the present disclosure at least has the following advantageous effects: An optical engine and a collimating lens module are provided in the present disclosure, and the optical engine is connected to the collimating lens module directly or via an optical fiber. Thus, it is not needed to use a copper wire, a back plate, or the like for connection, improving the communication rate, reducing upgrade costs, and implementing free-space optical communication. Compared with current radio signal communication, the present disclosure can realize high-speed signal transmission. Moreover, the present disclosure integrates units for sending, alignment, transmission, and receiving of an optical signal, further simplifying the design and meeting different application requirements.

It should be noted that, the above general description and the following specific implementation manners are merely exemplary and explanatory, and are not intended to limit the scope of the present disclosure.

BRIEF DESCRIPTION OF THE DRAWINGS

The following accompanying drawings form a part of the specification of the present disclosure, and illustrate the embodiments of the present disclosure. These accompanying drawings together with the description of the specification aim to explain the principle of the present disclosure.

DETAILED DESCRIPTION OF THE EXEMPLARY EMBODIMENTS

Figure 1:
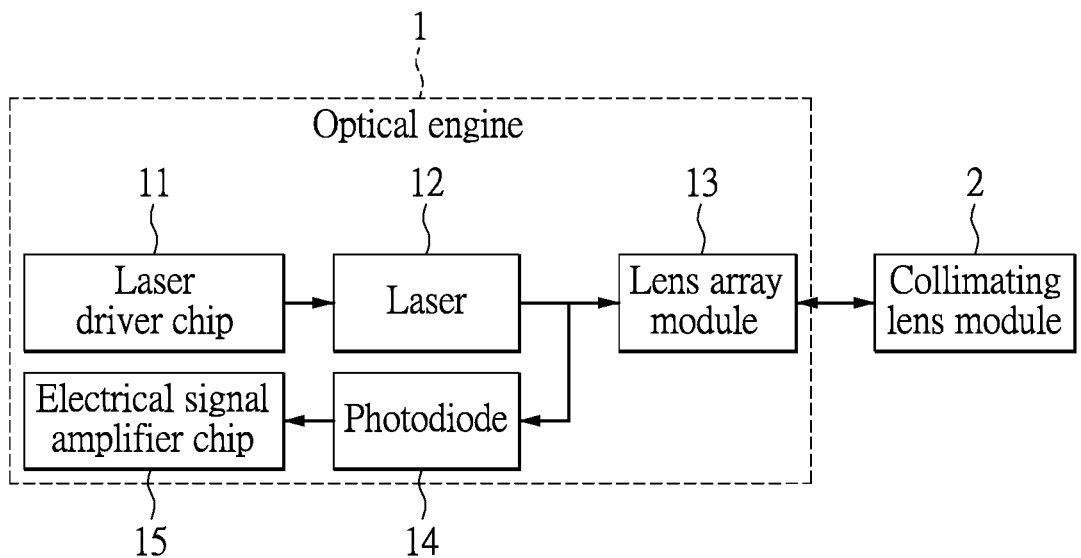
FIG. 1 is a first schematic structural diagram of a free-space optical signal alignment and transmission device provided by a specific implementation manner of the present disclosure.

To make the objective, technical solutions, and advantages of the embodiments of the present disclosure more comprehensible, the spirit of the content disclosed by the present disclosure will be clearly described below with reference to the accompanying drawings and detailed description. After understanding the embodiments of the content of the present disclosure, any person skilled in the art can make changes and modifications based on the techniques revealed by the content of the present disclosure. These changes and modifications all fall within the spirit and scope of the content of the present disclosure.

The illustrative embodiments of the present disclosure and descriptions thereof are used to explain the present disclosure, and do not constitute limitations to the present disclosure. In addition, elements/components denoted with the same or similar marks in the accompanying drawings and the implementation manners are used to represent the same or similar parts.

The "first", "second" and similar words used in the specification neither denote the order or sequence, nor limit the present disclosure. They are merely used to distinguish between elements or operations described with the same technical terms.

For orientation terms, such as up, down, left, right, front, and back, used in the specification only refer to the directions with reference to the accompanying drawings. Therefore, the orientation terms are used to describe rather than limit the present disclosure.

As used herein, "comprise", "include" "have", "contain" and the like are all open-ended terms, which mean to include but not limited to the described object.

As used herein, "and/or" includes any and all combinations of the things described.

As used herein, the term "multiple" includes "two" and "more than two"; and the term "multiple groups" includes "two groups" and "more than two groups".

The terms "approximately", "about" and the like are used in the specification to modify any quantity or error that can be slightly changed. However, these small changes or errors do not change their essence. Generally speaking, the range of these small changes or errors modified by such terms may be 20% in some embodiments, 10% in other embodiments, 5% or other values in some other embodiments. Persons skilled in the art should understand that the aforementioned values may be adjusted according to actual needs, and the present disclosure is not limited thereto.

Certain terms used to describe the present disclosure will be discussed below or elsewhere in the specification, so as to provide additional guidance for those skilled in the art on the basis of the description of the present disclosure.

Free-space optical communication is a two-way communication technique that uses laser beams to implement point-to-point, point-to-multipoint, or multipoint-to-multipoint audio, data, and image information transmission in an atmospheric channel. In brief, it is an atmospheric wireless laser communication technique, which combines the advantages of communication through the optical fiber 3 and the microwave. Thus, this technique achieves large communication capacity and high transmission speed without the need to install the optical fiber 3.

First Embodiment

FIG. 1 is a first schematic structural diagram of a free-space optical signal alignment and transmission device provided by an embodiment of the present disclosure. As shown in FIG. 1, the free-space optical signal alignment and transmission device includes an optical engine 1 and a collimating lens module 2 which are directly connected.

During transmission of an optical signal, the optical engine 1 is configured to convert an electrical signal into an optical signal, and the collimating lens module 2 is configured to collimate the optical signal transmitted from the optical engine 1 and then send the collimated signal to free space for transmission. For receiving of the optical signal, the collimating lens module 2 is configured to shape the optical signal received from the free space and then send the shaped signal to the optical engine 1, and the optical engine 1 is configured to convert the optical signal into an electrical signal.

Specifically, the optical engine 1 includes a base board, and a laser driver chip 11, a laser 12, a lens array module 13, a photodiode 14, and an electrical signal amplifier chip 15 that are provided on the base board. The laser driver chip 11 is connected to the laser 12, and the laser 12 is connected to the lens array module 13. One end of the photodiode 14 is connected to the lens array module 13, and the other end thereof is connected to the electrical signal amplifier chip 15. The base board may be, but is not limited to, a PCB board, a ceramic substrate, or the like.

During transmission of an optical signal, an electrical signal externally loaded with information is input into the laser driver chip 11 through pins, and the laser driver chip 11 drives the laser 12 to emit light. The optical signal is adjusted by the lens array module 13, and then enters the collimating lens module 2. The collimating lens module 2 collimates the optical signal transmitted from the optical engine 1, and then sends the collimated signal to the free space for transmission.

For receiving of the optical signal, the collimating lens module 2 shapes the optical signal received from the free space and then sends the shaped signal to the lens array module 13. The lens array module 13 adjusts the optical signal transmitted thereto, and then sends the adjusted signal to the photodiode 14. The photodiode 14 converts the optical signal into an electrical signal, and then sends the electrical signal to the electrical signal amplifier chip 15 for amplification. A signal output by the electrical signal amplifier chip 15 may be sent to an external circuit through pins.

In this embodiment, the lens array module 13 and the collimating lens module 2 both can realize bidirectional or unidirectional transmission of the optical signal. The lens array module 13 can make a light path refract or straightly pass through.

Figure 2:
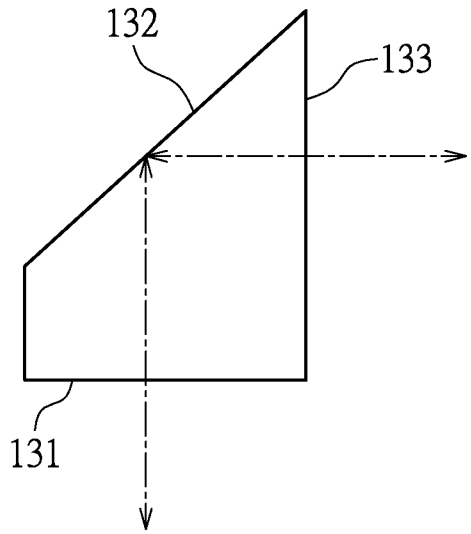
FIG. 2 is a schematic diagram of an embodiment of a lens array module of the free-space optical signal alignment and transmission device provided by a specific implementation manner of the present disclosure.

FIG. 2 is a schematic diagram of an embodiment of a lens array module 13 of the free-space optical signal alignment and transmission device in the present disclosure. The lens array module 13 may be formed by one or multiple lenses. When the lens array module 13 is formed by one lens and is used to refract a light path, the lens has a first surface 131, a second surface 132, and a third surface 133, as shown in FIG. 2. During transmission of an optical signal, the optical signal that is sent out enters the lens through its first surface 131, is refracted by the second surface 132 and transmitted out of the lens through the third surface 133, and then enters the collimating lens module 2. For receiving of the optical signal, the optical signal collimated by the collimating lens module 2 enters the lens through the third surface 133, is refracted by the second surface 132 and transmitted out of the lens through the first surface 131, and then enters the photodiode 14. Preferably, an included angle between the second surface 132 of the lens and an incident direction of the optical signal is 45°.

Figure 3:
FIG. 3 is a schematic diagram of another embodiment of a lens array module of the free-space optical signal alignment and transmission device provided by a specific implementation manner of the present disclosure.

FIG. 3 is a schematic diagram of another embodiment of the lens array module 13 of the free-space optical signal alignment and transmission device in the present disclosure. When the lens array module 13 is formed by one lens and is used to make the light path straightly pass through, the lens has a fourth surface 134 and a fifth surface 135, as shown in FIG. 3. During transmission of an optical signal, the optical signal that is sent out enters the lens through its fourth surface 134, is transmitted out of the lens through the fifth surface 135, and directly enters the collimating lens module 2. For receiving of the optical signal, the optical signal collimated by the collimating lens module 2 enters the lens through its fifth surface 135, is transmitted out of the lens through the fourth surface 134, and enters the photodiode 14.

In this embodiment, the collimating lens module 2 is formed by one or multiple condensers.

In the free-space optical signal alignment and transmission device provided by the embodiment of the present disclosure, the optical engine 1 is directly connected to the collimating lens module 2, and units for sending, alignment, transmission, and receiving of an optical signal are integrated together. Thus, it is not needed to use a copper wire, a back plate, or the like for connection, improving the communication rate, reducing upgrade costs, further simplifying the design, and meeting different application requirements.

Second Embodiment

Figure 4:
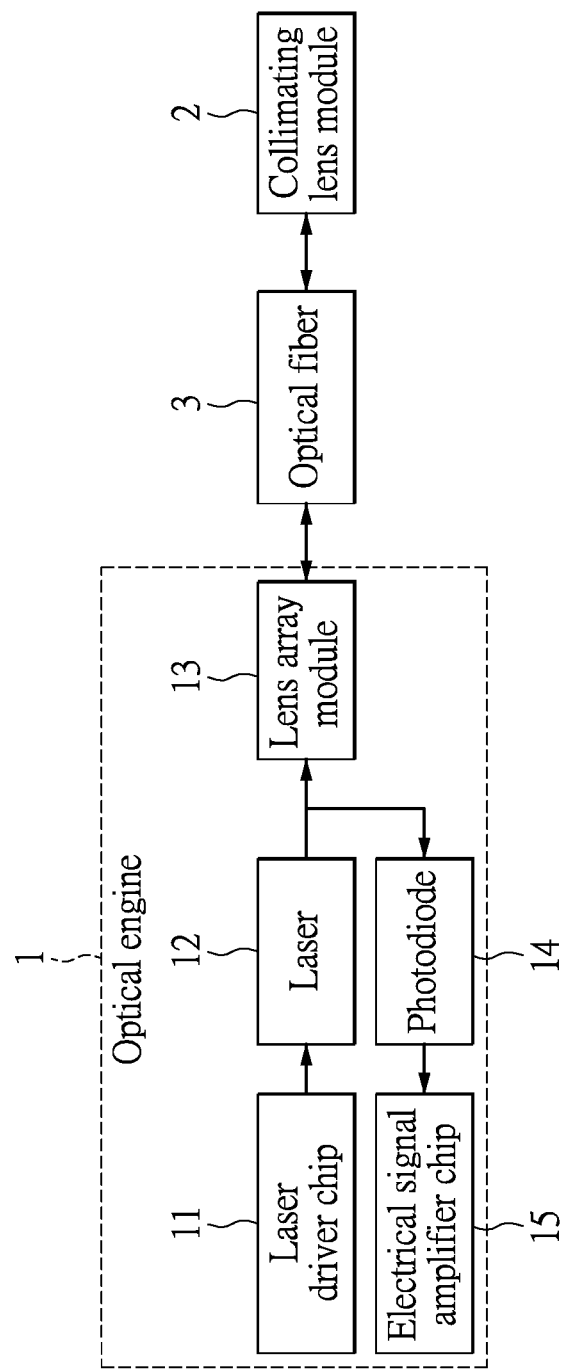
FIG. 4 is a second schematic structural diagram of a free-space optical signal alignment and transmission device provided by a specific implementation manner of the present disclosure.

FIG. 4 is a second schematic structural diagram of a free-space optical signal alignment and transmission device provided by an embodiment of the present disclosure. As shown in FIG. 4, the free-space optical signal alignment and transmission device includes an optical engine 1, a collimating lens module 2, and an optical fiber 3. The optical engine 1 is connected to the collimating lens module 2 via the optical fiber 3.

During transmission of an optical signal, the optical engine 1 is configured to convert an electrical signal into an optical signal, the optical fiber 3 is configured for signal transmission, and the collimating lens module 2 is configured to collimate the optical signal transmitted from the optical fiber 3 and then send the collimated signal to free space for transmission. For receiving of the optical signal, the collimating lens module 2 is configured to shape the optical signal received from the free space, and then send the shaped signal to the optical engine 1 via the optical fiber 3; and the optical engine 1 is configured to convert the optical signal into an electrical signal.

The circuit structure of the optical engine 1 is identical with that in the first embodiment, so the details are not described herein again.

During transmission of an optical signal, an electrical signal externally loaded with information is input into the laser driver chip 11, and the laser driver chip 11 drives the laser 12 to emit light. The optical signal is adjusted by the lens array module 13, and then enters the collimating lens module 2 through the optical fiber 3. The collimating lens module 2 collimates the optical signal transmitted from the optical fiber 3, and then sends the collimated signal to the free space for transmission.

For receiving of the optical signal, the collimating lens module 2 shapes the optical signal received from the free space and then sends the shaped signal to the lens array module 13 via the optical fiber 3. The lens array module 13 adjusts the optical signal transmitted thereto, and then sends the adjusted signal to the photodiode 14. The photodiode 14 converts the optical signal into an electrical signal, and then sends the electrical signal to the electrical signal amplifier chip 15 for amplification. A signal output by the electrical signal amplifier chip 15 is sent to an external circuit.

In this embodiment, the lens array module 13 and the collimating lens module 2 both can realize bidirectional or unidirectional transmission of the optical signal. The lens array module 13 can make a light path refract or straightly pass through.

In this embodiment, the lens array module 13 and the collimating lens module 2 both have the same structure with those in the first embodiment, so the details are not described herein again.

In the free-space optical signal alignment and transmission device provided by the embodiment of the present disclosure, the optical engine 1 is connected to the collimating lens module 2 via the optical fiber 3, and units for sending, alignment, transmission, and receiving of an optical signal are integrated together. Thus, it is not needed to use a copper wire, a back plate, or the like for connection, improving the communication rate, reducing upgrade costs, further simplifying the design, and meeting different application requirements.

Third Embodiment

Based on the foregoing first and second embodiments, the free-space optical signal alignment and transmission device further includes a WDM unit configured for combination and separation of optical wavelengths, which serves as an optical multiplexer during combination of the optical wavelengths and as an optical demultiplexer during separation of the optical wavelengths. During transmission of an optical signal, the WDM unit is configured to combine multiple paths of optical signals output by the optical engine 1 on one path for transmission. For receiving of the optical signal, the WDM unit is configured to split the received one path of optical signal into multiple paths for transmission.

Based on the foregoing first and second embodiments, the free-space optical signal alignment and transmission device further includes an alignment assembly which may be a locating pin or a locating hole and is provided on the base board. The alignment assembly can facilitate alignment of two paired optical engines 1. In practice, a first optical signal alignment and transmission device is used as a transmitter, and a second optical signal alignment and transmission device is used as a receiver. A base board of an optical engine of the first optical signal alignment and transmission device is provided with a locating pin, and a base board of an optical engine of the second optical signal alignment and transmission device is provided with a locating hole. By the fit between the locating pin and the locating hole, the optical engine of the first optical signal alignment and transmission device is aligned with the optical engine of the second optical signal alignment and transmission device.

Fourth Embodiment

An embodiment of the present disclosure further provides a free-space optical signal alignment and transmission system, which includes a driver controller and at least one information transceiver chip. The free-space optical signal alignment and transmission device is disposed on the information transceiver chip which is further provided with a transceiving transfer switch.

Controlled by the driver controller, the transceiving transfer switch is switched to a transmission state. In this case, the laser driver chip 11 drives the laser 12 to convert an electrical signal to be transmitted into an optical signal. Then the optical signal refracts or straightly passes through the lens array module 13, enters the collimating lens module 2 and is collimated by it; and the collimated signal is sent to free space for transmission.

Controlled by the driver controller, the transceiving transfer switch is switched to a receiving state. In this case, the collimating lens module 2 collimates the received optical signal, and sends the collimated signal to the lens array module 13. Then the optical signal refracts or straightly passes through the lens array module 13, enters the photodiode 14, and is converted by the photodiode 14 into an electrical signal. The electrical signal is sent to the electrical signal amplifier chip 15, and the electrical signal amplifier chip 15 amplifies the electrical signal and outputs the amplified signal.

Based on the free-space optical signal alignment and transmission system provided by the foregoing embodiment of the present disclosure, an information transceiver chip is provided in the system and a transceiving transfer switch is provided on the information transceiver chip, thus integrating functions of sending and receiving of an optical signal.

Preferably, the laser 12 in the optical engine 1 may be a Vertical Cavity Surface Emitting Laser (VCSEL) 12.

Fifth Embodiment

Figure 5:
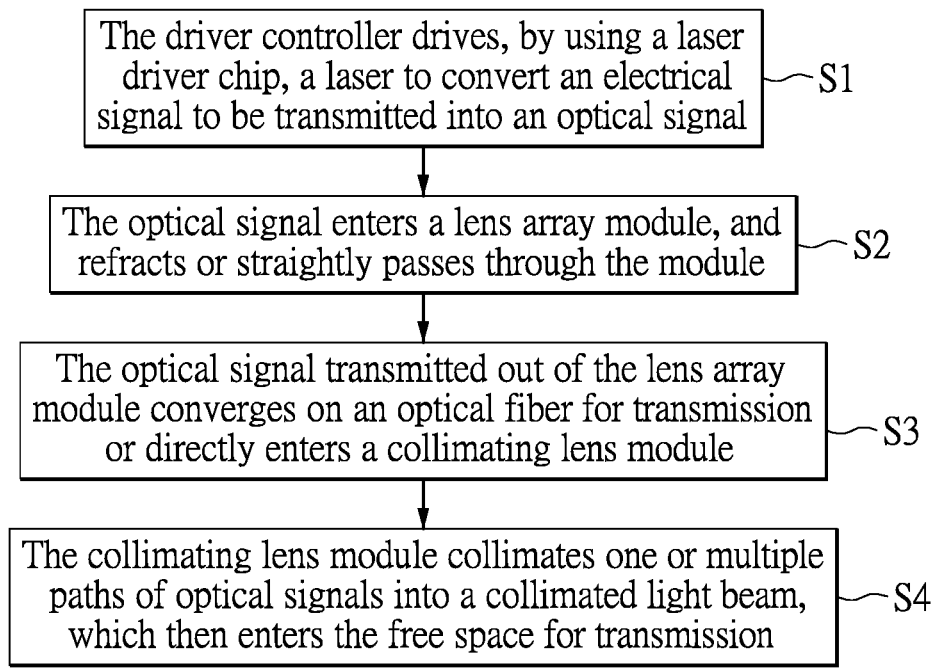
FIG. 5 is a first flowchart of a free-space optical signal alignment and transmission method provided by a specific implementation manner of the present disclosure.

Based on the free-space optical signal alignment and transmission system provided by fourth embodiment, an embodiment of the present disclosure further provides a free-space optical signal alignment and transmission method. FIG. 5 is a first flowchart of the free-space optical signal alignment and transmission method in the present disclosure. As shown in FIG. 5, for transmission of an optical signal, the free-space optical signal alignment and transmission method includes the following steps:

S1. The driver controller drives, by using a laser driver chip 11, a laser 12 to convert an electrical signal to be transmitted into an optical signal.

S2. The optical signal enters a lens array module 13, and refracts or straightly passes through the module.

S3. The optical signal transmitted out of the lens array module 13 converges on an optical fiber 3 for transmission or directly enters a collimating lens module 2.

S4. The collimating lens module 2 collimates one or multiple paths of optical signals into a collimated light beam, which then enters the free space for transmission.

Sixth Embodiment

Figure 6:
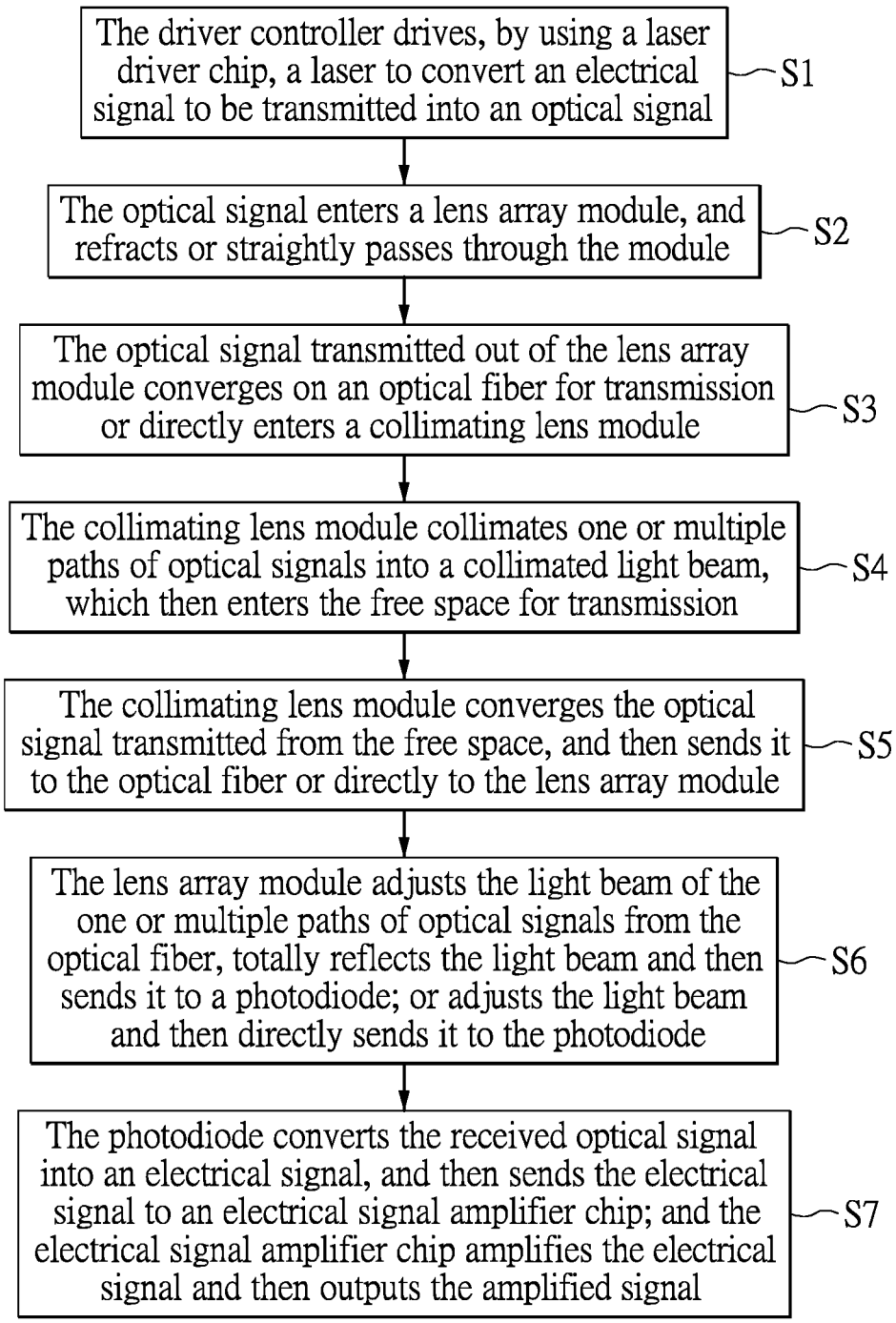
FIG. 6 is a second flowchart of a free-space optical signal alignment and transmission method provided by a specific implementation manner of the present disclosure.

Based on the free-space optical signal alignment and transmission system provided by the fourth embodiment, an embodiment of the present disclosure further provides a free-space optical signal alignment and transmission method. FIG. 6 is a second flowchart of the free-space optical signal alignment and transmission method in the present disclosure. As shown in FIG. 6, for receiving of an optical signal, the free-space optical signal alignment and transmission method includes the following steps:

S5. The collimating lens module 2 converges the optical signal transmitted from the free space, and then sends it to the optical fiber 3 or directly to the lens array module 13.

S6. The lens array module 13 adjusts the light beam of the one or multiple paths of optical signals from the optical fiber 3, totally reflects the light beam and then sends it to a photodiode 14; or adjusts the light beam and then directly sends it to the photodiode 14.

S7. The photodiode 14 converts the received optical signal into an electrical signal, and then sends the electrical signal to an electrical signal amplifier chip 15. The electrical signal amplifier chip 15 amplifies the electrical signal and then outputs the amplified signal.

Based on the free-space optical signal alignment and transmission method provided by the foregoing embodiments of the present disclosure, during transmission, the laser driver chip 11, the laser 12, the lens array module 13, the optical fiber 3, and the collimating lens module 2 are used to send the optical signal to the free space for transmission. During receiving, the collimating lens module 2, the optical fiber 3, the lens array module 13, the photodiode 14, and the electrical signal amplifier chip 15 are used to receive the optical signal. Thus, the method implements communication between intelligent terminals without the need to install cables, and realizes high-speed transmission of the optical signal in comparison with the current radio signal transmission manner.

The above merely describes specific implementation manners of the present disclosure. Any person skilled in the art can make equivalent changes and modifications without departing from the concept and principle of the present disclosure. These changes and modifications all fall within the scope of protection of the present disclosure.

What is claimed is:

1. A free-space optical signal alignment and transmission device, comprising an optical engine, a collimating lens module, and an optical fiber, the optical engine being connected to the collimating lens module via the optical fiber, wherein the optical engine is configured to convert an electrical signal into an optical signal; the collimating lens module is configured to collimate the optical signal transmitted from the optical engine and then send the collimated signal to free space for transmission; the collimating lens module is further configured to shape the optical signal received from the free space and then send the shaped signal to the optical engine; and the optical engine is further configured to convert the optical signal into the electrical signal;

the optical engine comprises a base board, and a laser driver chip, a laser, a lens array module, a photodiode, and an electrical signal amplifier chip that are provided on the base board;

the electrical signal externally loaded with information is input into the laser driver chip, and the laser driver chip drives the laser to emit light; the lens array module is configured to collimate or totally reflect the optical signal, or to collimate the optical signal and make it straightly pass through; and the collimating lens module collimates the optical signal transmitted from the optical engine and then sends the collimated signal to the free space for transmission; and the collimating lens module shapes the optical signal received from the free space and then sends the shaped signal to the lens array module; the lens array module adjusts the optical signal transmitted thereto, and then sends the adjusted signal to the photodiode; the photodiode converts the optical signal into an electrical signal, and then sends the electrical signal to the electrical signal amplifier chip for amplification; and a signal output by the electrical signal amplifier chip is sent to an external circuit.

2. The free-space optical signal alignment and transmission device according to claim 1, wherein the lens array module is formed by one or multiple lenses.

3. The free-space optical signal alignment and transmission device according to claim 2, wherein when the lens array module is formed by one lens and is used to refract a light path, the lens has a first surface, a second surface, and a third surface;

the optical signal that is sent out enters the lens through its first surface, is refracted by the second surface and transmitted out of the lens through the third surface, and then enters the collimating lens module; and the optical signal collimated by the collimating lens module enters the lens through its third surface, is refracted by the second surface and transmitted out of the lens through the first surface, and then enters the photodiode.

4. The free-space optical signal alignment and transmission device according to claim 3, wherein an included angle between the second surface of the lens and an incident direction of the optical signal is 45°.

5. The free-space optical signal alignment and transmission device according to claim 2, wherein when the lens array module is formed by one lens and is used to make a light path straightly pass through, the lens has a fourth surface and a fifth surface;

the optical signal that is sent out enters the lens through its fourth surface, is transmitted out of the lens through the fifth surface, and directly enters the collimating lens module; and the optical signal collimated by the collimating lens module enters the lens through its fifth surface, is transmitted out of the lens through the fourth surface, and enters the photodiode.

6. The free-space optical signal alignment and transmission device according to claim 1, further comprising a WDM unit, configured to combine multiple paths of optical signals output by the optical engine on one path for transmission, and further configured to split the received one path of optical signal into multiple paths for transmission.

7. A free-space optical signal alignment and transmission system, comprising a driver controller and at least one information transceiver chip, wherein the free-space optical signal alignment and transmission device according to claim 1 is disposed on the information transceiver chip, and the information transceiver chip is further provided with a transceiving transfer switch;

the driver controller controls the transceiving transfer switch to perform a state switch; the laser driver chip drives the laser to convert the electrical signal into the optical signal; then the optical signal refracts or straightly passes through the lens array module, enters the collimating lens module and is collimated by it; and the collimated signal is sent to free space for transmission; and the collimating lens module collimates the optical signal, and sends the collimated signal to the lens array module; then the optical signal refracts or straightly passes through the lens array module, enters the photodiode, and is converted by the photodiode into an electrical signal; the electrical signal is sent to the electrical signal amplifier chip, and the electrical signal amplifier chip amplifies the electrical signal and outputs the amplified signal.

8. A free-space optical signal alignment and transmission system, comprising a driver controller and at least one information transceiver chip, wherein the free-space optical signal alignment and transmission device according to claim 2 is disposed on the information transceiver chip, and the information transceiver chip is further provided with a transceiving transfer switch;

the driver controller controls the transceiving transfer switch to perform a state switch; the laser driver chip drives the laser to convert the electrical signal into the optical signal; then the optical signal refracts or straightly passes through the lens array module, enters the collimating lens module and is collimated by it; and the collimated signal is sent to free space for transmission; and the collimating lens module collimates the optical signal, and sends the collimated signal to the lens array module; then the optical signal refracts or straightly passes through the lens array module, enters the photodiode, and is converted by the photodiode into an electrical signal; the electrical signal is sent to the electrical signal amplifier chip, and the electrical signal amplifier chip amplifies the electrical signal and outputs the amplified signal.

9. A free-space optical signal alignment and transmission system, comprising a driver controller and at least one information transceiver chip, wherein the free-space optical signal alignment and transmission device according to claim 3 is disposed on the information transceiver chip, and the information transceiver chip is further provided with a transceiving transfer switch;

the driver controller controls the transceiving transfer switch to perform a state switch; the laser driver chip drives the laser to convert the electrical signal into the optical signal; then the optical signal refracts or straightly passes through the lens array module, enters the collimating lens module and is collimated by it; and the collimated signal is sent to free space for transmission; and the collimating lens module collimates the optical signal, and sends the collimated signal to the lens array module; then the optical signal refracts or straightly passes through the lens array module, enters the photodiode, and is converted by the photodiode into an electrical signal; the electrical signal is sent to the electrical signal amplifier chip, and the electrical signal amplifier chip amplifies the electrical signal and outputs the amplified signal.

10. A free-space optical signal alignment and transmission system, comprising a driver controller and at least one information transceiver chip, wherein the free-space optical signal alignment and transmission device according to claim 4 is disposed on the information transceiver chip, and the information transceiver chip is further provided with a transceiving transfer switch;

the driver controller controls the transceiving transfer switch to perform a state switch; the laser driver chip drives the laser to convert the electrical signal into the optical signal; then the optical signal refracts or straightly passes through the lens array module, enters the collimating lens module and is collimated by it; and the collimated signal is sent to free space for transmission; and the collimating lens module collimates the optical signal, and sends the collimated signal to the lens array module; then the optical signal refracts or straightly passes through the lens array module, enters the photodiode, and is converted by the photodiode into an electrical signal; the electrical signal is sent to the electrical signal amplifier chip, and the electrical signal amplifier chip amplifies the electrical signal and outputs the amplified signal.

* * * * *